US012577065B2

(12) United States Patent
Honoki et al.

(10) Patent No.: US 12,577,065 B2
(45) Date of Patent: Mar. 17, 2026

(54) CONVEYING APPARATUS AND PEELING APPARATUS

(71) Applicant: DISCO CORPORATION, Tokyo (JP)

(72) Inventors: Koyo Honoki, Tokyo (JP); Koji Itabashi, Tokyo (JP); Ryohei Yamamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 268 days.

(21) Appl. No.: 17/930,197

(22) Filed: Sep. 7, 2022

(65) Prior Publication Data

US 2023/0082612 A1 Mar. 16, 2023

(30) Foreign Application Priority Data

Sep. 10, 2021 (JP) ................................. 2021-148128

(51) Int. Cl.
| | |
|---|---|
| *B65G 47/91* | (2006.01) |
| *B23K 26/38* | (2014.01) |
| *B32B 43/00* | (2006.01) |
| *B65G 47/90* | (2006.01) |

(52) U.S. Cl.
CPC ............ *B65G 47/91* (2013.01); *B32B 43/006* (2013.01); *B65G 47/905* (2013.01); *B23K 26/38* (2013.01)

(58) Field of Classification Search
CPC .... B65G 47/91; B65G 47/905; B65G 47/917; B32B 43/006; B23K 26/38; B23K 26/53; H01L 21/6838
See application file for complete search history.

(56) References Cited

U.S. PATENT DOCUMENTS

| | | | | |
|---|---|---|---|---|
| 5,733,182 | A | * | 3/1998 | Muramatsu ........... B24B 41/068 451/388 |
| 6,080,040 | A | * | 6/2000 | Appel ..................... B24B 21/04 451/10 |
| 2019/0160708 | A1 | * | 5/2019 | Hinohara ........... B23K 26/0853 |

FOREIGN PATENT DOCUMENTS

| | | | | |
|---|---|---|---|---|
| JP | 2015207776 | A | * 11/2015 | ............. B32B 38/10 |
| JP | 2016111143 | A | 6/2016 | |
| JP | 2019102513 | A | 6/2019 | |

* cited by examiner

*Primary Examiner* — George R Koch
(74) *Attorney, Agent, or Firm* — Greer Burns & Crain Ltd.

(57) ABSTRACT

A conveying apparatus for conveying a plate-shaped workpiece includes a holding unit that holds the plate-shaped workpiece under suction, a moving unit that moves in a vertical direction together with the holding unit, a detection unit that detects that the holding unit has moved downward and made contact with the plate-shaped workpiece, and a control unit that performs control to stop a downward movement of the moving unit when the detection unit detects that the holding unit has made contact with the plate-shaped workpiece.

17 Claims, 5 Drawing Sheets

CONVEYING APPARATUS AND PEELING APPARATUS

BACKGROUND OF THE INVENTION

Field of the Invention

The present invention relates to a conveying apparatus and a peeling apparatus.

Description of the Related Art

A wafer formed with a plurality of devices, such as a semiconductor wafer, is generally produced by slicing a cylindrical semiconductor ingot by a wire saw. However, when the ingot is sliced by the wire saw and the front and back sides of the wafer thus produced are then polished, most of the ingot is discarded, which is uneconomical. In view of this, a technology of applying, to an ingot, a laser beam of such a wavelength as to be transmitted through the ingot to form a peeling layer inside the ingot and a technology of peeling off a wafer from the ingot along the peeling layer that act as a division initiating point have been proposed (see Japanese Patent Laid-open No. 2016-111143 and Japanese Patent Laid-open No. 2019-102513).

SUMMARY OF THE INVENTION

Incidentally, the wafer peeled off from the ingot in this manner is held under suction by a holding unit of a peeling apparatus and conveyed to the exterior of the apparatus. In this instance, in the peeling apparatus, since wafers are peeled off from ingots of various thicknesses, there is a problem that, when the holding unit is lowered from above the wafer to hold the peeled wafer, it is difficult to know to what extent the holding unit should be lowered. Therefore, it is necessary for an operator to input the ingot thickness measured by measuring equipment or the like before the wafer is peeled off, which is intricate, and there is a possibility of damaging the apparatus or the workpiece due to human errors.

Accordingly, it is an object of the present invention to provide a conveying apparatus and a peeling apparatus that are able to automatically detect a moving amount of a holding unit holding a wafer when the holding unit moves downward.

In accordance with an aspect of the present invention, there is provided a conveying apparatus for conveying a plate-shaped workpiece by holding the plate-shaped workpiece by a holding unit. The conveying apparatus includes the holding unit that holds the plate-shaped workpiece under suction, a moving unit that moves in a vertical direction together with the holding unit, a detection unit that detects that the holding unit has moved downward and made contact with the plate-shaped workpiece, and a control unit that performs control to stop a downward movement of the moving unit when the detection unit detects that the holding unit has made contact with the plate-shaped workpiece.

Preferably, the detection unit detects a variation in a moving amount of the holding unit in the vertical direction when the holding unit moves downward, and the control unit performs control to stop the downward movement of the moving unit when the detection unit detects that the holding unit has made contact with the plate-shaped workpiece and that the moving amount will not vary any more.

Preferably, the detection unit is provided above the holding unit and moves in the vertical direction together with the moving unit.

Preferably, the holding unit includes a holding plate that holds the plate-shaped workpiece, a plurality of pin members formed upright on the holding plate, a first plate that is provided above the holding plate and that is formed with a plurality of through-holes allowing the pin members to pass therethrough, and a second plate that is provided above the first plate and that is connected to the pin members, and the first plate and the moving unit are connected to each other and move together.

Preferably, the pin members and the second plate are connected to each other via elastic members. Preferably, the detection unit detects a variation in a distance between the moving unit and the holding plate or a variation in a distance between the moving unit and the second plate.

In accordance with another aspect of the present invention, there is provided a peeling apparatus for peeling off a wafer to be manufactured from an ingot having a peeling layer formed therein. The peeling layer is formed by applying a laser beam of such a wavelength as to be transmitted through the ingot to the ingot with a focal point of the laser beam positioned inside the ingot at a depth corresponding to a thickness of the wafer to be manufactured from an end face of the ingot. The peeling apparatus includes a holding table that holds the ingot, and a conveying apparatus disposed to face the holding table. The conveying apparatus includes a holding unit that holds the wafer under suction, a moving unit that moves in a vertical direction together with the holding unit, a detection unit that detects that the holding unit has moved downward and made contact with the wafer, and a control unit that performs control to stop a downward movement of the moving unit when the detection unit detects that the holding unit has made contact with the wafer.

According to the present invention, it is possible to automatically detect the moving amount of the holding unit holding the wafer when the holding unit moves downward.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
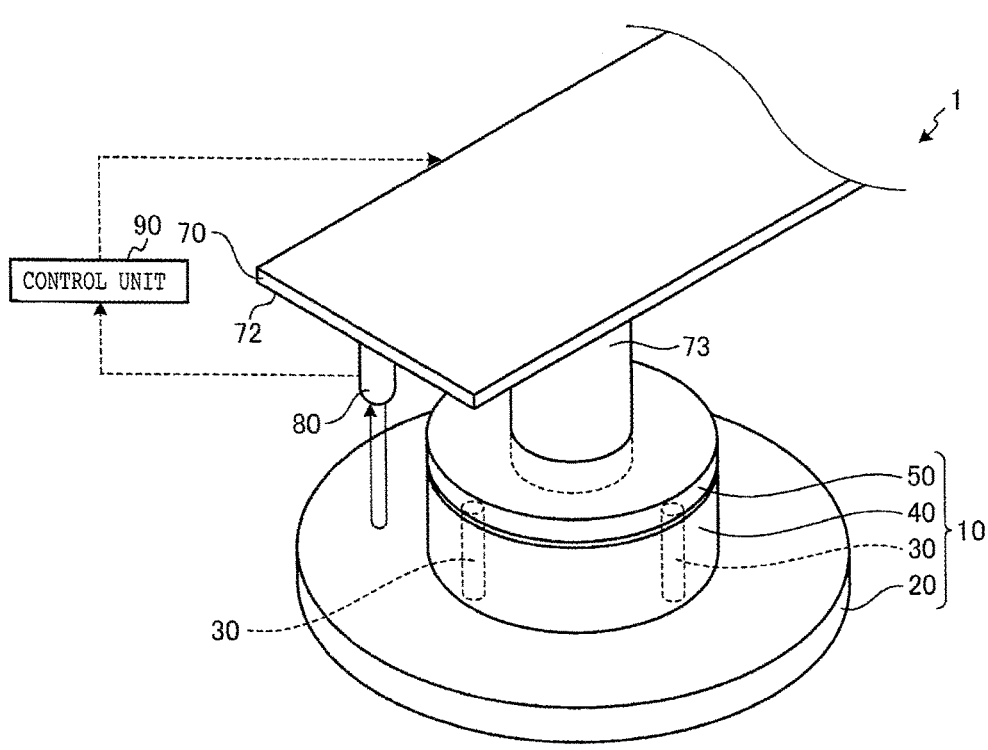
FIG. 1 is a perspective view depicting a configuration example of a conveying apparatus according to an embodiment.

An embodiment of the present invention will be described in detail below referring to the drawings. The present invention is not to be limited by the contents described in the following embodiment. In addition, the following constituent elements include those which are easily conceivable by a person skilled in the art and those which are substantially the same. Further, the configurations described below can be combined with one another as required. Besides, various omissions, replacements, or modifications of the configurations can be made in such ranges as not to depart from the gist of the present invention.

Figure 2:
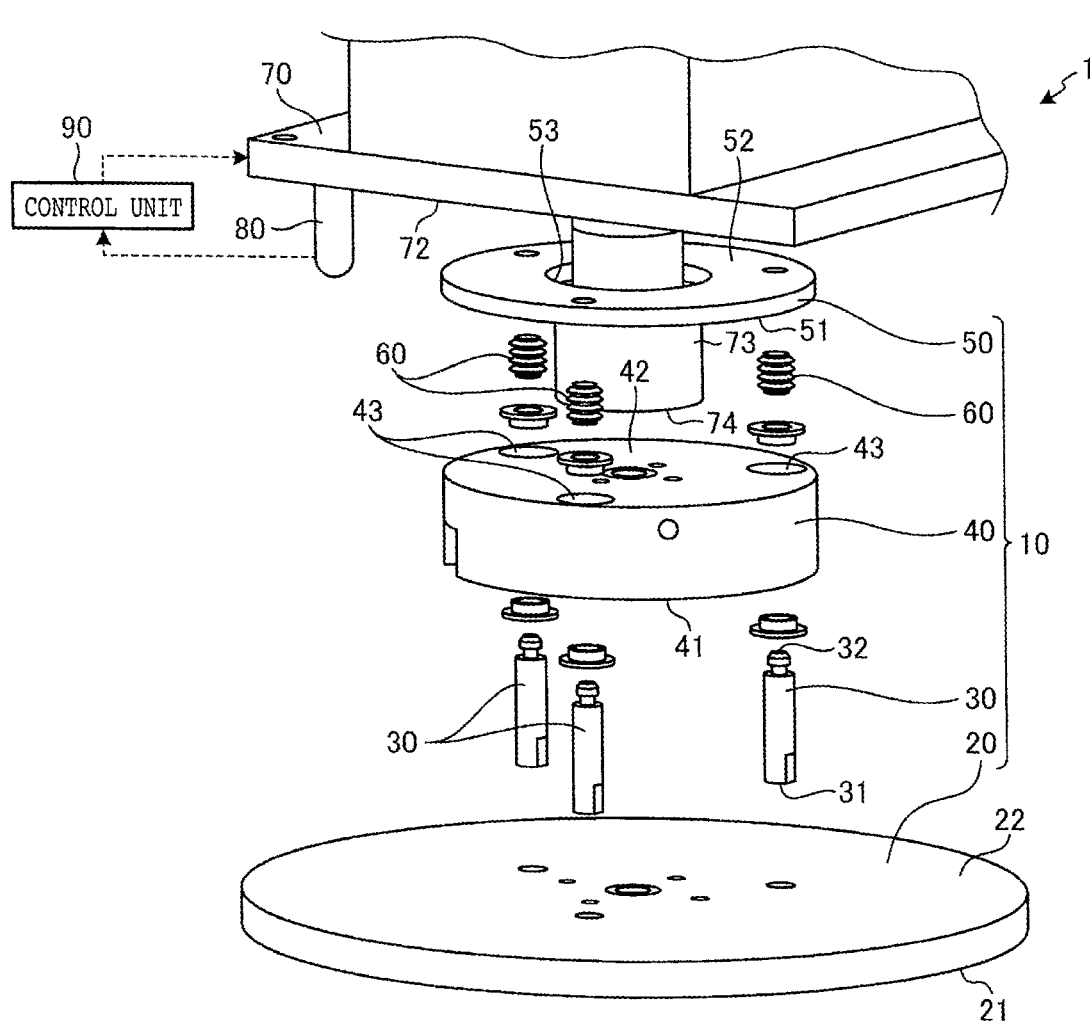
FIG. 2 is an exploded perspective view of the conveying apparatus depicted in FIG. 1.
Figure 3:
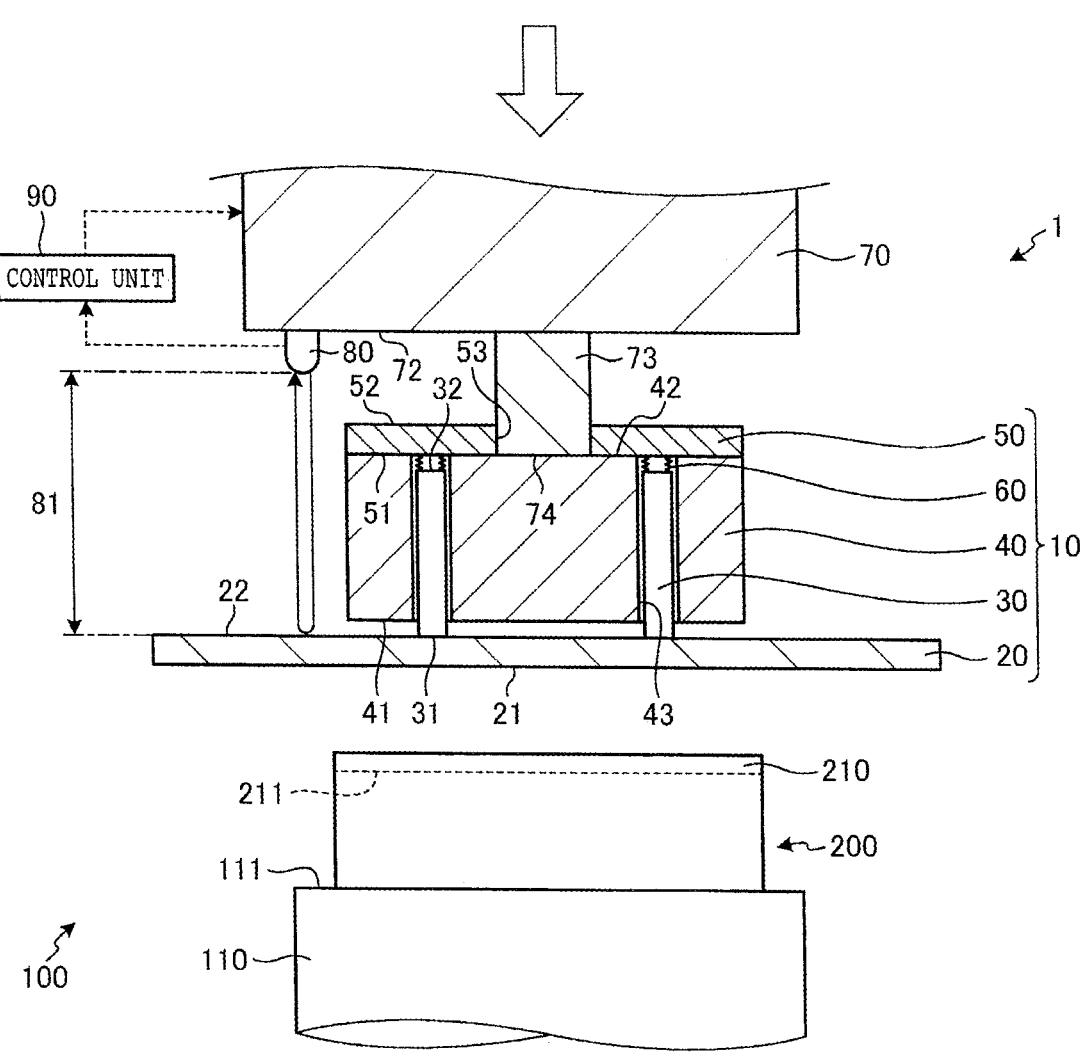
FIG. 3 is a side view depicting, partly in section, a state of a peeling apparatus according to an embodiment.
Figure 4:
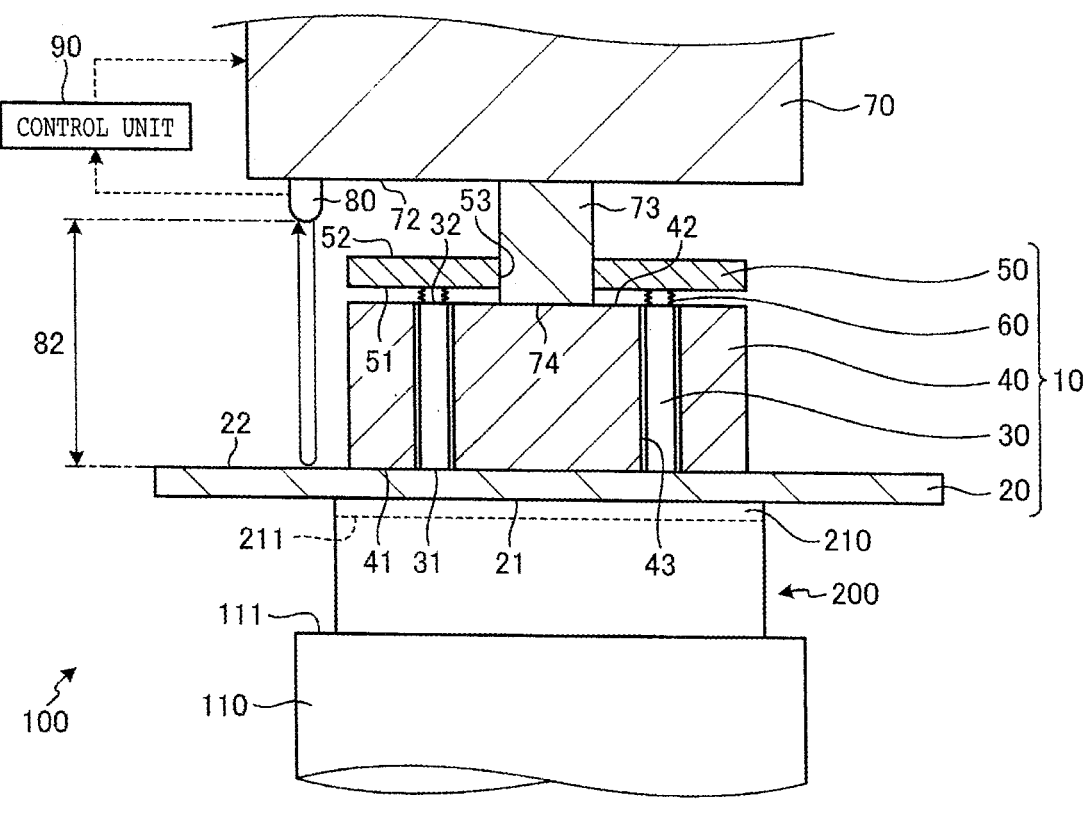
FIG. 4 is a side view depicting, partly in section, another state of the peeling apparatus depicted in FIG. 3.

First, configurations of a conveying apparatus 1 and a peeling apparatus 100 according to an embodiment of the present invention will be described on the basis of the drawings. FIG. 1 is a perspective view depicting a configuration example of the conveying apparatus 1 according to the embodiment. FIG. 2 is an exploded view of the conveying apparatus 1 depicted in FIG. 1. FIG. 3 is a side view depicting, partly in section, a state of the peeling apparatus 100 according to the embodiment. FIG. 4 is a side view depicting, partly in section, another state of the peeling apparatus 100 depicted in FIG. 3.

The conveying apparatus 1 according to the embodiment depicted in FIG. 1 is an apparatus for conveying a plate-shaped workpiece between a plurality of processing apparatuses. The plate-shaped workpiece in the embodiment includes a wafer 210 (see FIGS. 3 and 4) peeled off from an ingot 200. The conveying apparatus 1 includes a holding unit 10, a moving unit 70, a detection unit 80, and a control unit 90.

The holding unit 10 holds the plate-shaped workpiece under suction. The conveying apparatus 1 conveys the plate-shaped workpiece by holding it by the holding unit 10. The holding unit 10 has an upper portion supported by the moving unit 70. The holding unit 10 in the embodiment includes a holding plate 20, a plurality of pin members 30, a first plate 40, a second plate 50, and an elastic member 60.

The holding plate 20 is provided at the lowermost side of the holding unit 10. The holding plate 20 holds the plate-shaped workpiece on its lower surface 21. The holding plate 20 has a suction passage formed therein. The suction passage is connected to a suction source, not illustrated, and is used for sucking the plate-shaped workpiece which is in contact with the lower surface 21. The suction passage opens to the lower surface 21. With a negative pressure generated by the suction source, the holding plate 20 holds the plate-shaped workpiece on its lower surface 21. On an upper surface 22 of the holding plate 20, the plurality of pin members 30 are provided fixedly. The holding plate 20 has the upper surface 22 facing a lower surface 41 of the first plate 40.

The plurality of pin members 30 are each formed upright on the holding plate 20. The pin member 30 has a lower end portion 31 provided fixedly on the upper surface 22 of the holding plate 20. The pin members 30 are connected with the second plate 50. The pin member 30 in the embodiment has an upper end portion 32 connected to the second plate 50 through the elastic member 60.

The first plate 40 is provided above the holding plate 20. The first plate 40 has a lower surface 41 facing the upper surface 22 of the holding plate 20. The first plate 40 has an upper surface 42 facing a lower surface 51 of the second plate 50. In other words, the first plate 40 is provided between the holding plate 20 and the second plate 50.

The first plate 40 is formed with a plurality of through-holes 43 corresponding to the respective pin members 30. The through-holes 43 extends along the vertical direction from the lower surface 41 to the upper surface 42 of the first plate 40. The respective through-holes 43 allow corresponding ones of the pin members 30 to pass therethrough.

The first plate 40 is connected with the moving unit 70. In the embodiment, the upper surface 42 of the first plate 40 is fixed to a lower end portion 74 of a connection section 73 projecting downward from the lower surface 72 of the moving unit 70. The first plate 40 is supported by the moving unit 70 through the connection section 73.

The second plate 50 is provided above the first plate 40. The second plate 50 has the lower surface 51 facing the upper surface 42 of the first plate 40. The second plate 50 has an upper surface 52 facing the lower surface 72 of the moving unit 70.

The second plate 50 is provided with a through-hole 53 through which the connection section 73 projecting downward from the lower surface 72 of the moving unit 70 is passed. The through-hole 53 is provided to penetrate from the lower surface 51 to the upper surface 52 of the second plate 50. The through-hole 53 allows the connection section 73 to pass therethrough.

The second plate 50 is connected with the plurality of pin members 30. The second plate 50 in the embodiment is connected with the plurality of respective pin members 30 through the elastic members 60 on the lower surface 51 side. The second plate 50 supports the holding plate 20 through the pin members 30.

The elastic members 60 connect the pin members 30 and the second plate 50 to each other. The elastic member 60 in the embodiment is a compression spring. The elastic members 60 are provided between the upper end portions 32 of the pin members 30 and the lower surface 51 of the second plate 50, and mitigate the shock at the time when the pin members 30 approach the second plate 50.

The moving unit 70 moves in the vertical direction together with the holding unit 10. The moving unit 70 is, for example, guided in the vertical direction by a guide member, not illustrated, and is moved in the vertical direction by a driving force of a drive source, not illustrated. Note that the moving unit 70 may be configured to move also in a horizontal direction.

The moving unit 70 in the embodiment has the lower surface 72 facing the upper surface 52 of the second plate 50. The moving unit 70 has the connection section 73 projecting downward from the lower surface 72. The connection section 73 is provided to pass through the through-hole 53 of the second plate 50. The connection section 73 has the lower end portion 74 fixed to the upper surface 42 of the first plate 40. The moving unit 70 supports the first plate 40 through the connection section 73. In other words, in the embodiment, the first plate 40 and the moving unit 70 move together.

The detection unit 80 detects that the holding unit 10 has moved downward and made contact with the plate-shaped workpiece. In the embodiment, the detection unit 80 detects a variation in the moving amount of the holding unit 10 in the vertical direction when the holding unit 10 moves downward. The detection unit 80 detects, for example, that the holding unit 10 has made contact with the plate-shaped workpiece and that the moving amount will not be varied any more. The detection unit 80 includes a non-contact type distance sensor for measuring the distance to the holding plate 20. Note that the detection unit 80 in the present invention is not limited to the one in the embodiment, and may include a distance sensor for measuring the distance to such a member as the second plate 50 connected with the holding plate 20 or may include a contact type distance sensor. The detection unit 80 outputs the detection result to the control unit 90.

The detection unit 80 in the embodiment is provided above the holding unit 10 and moves in the vertical direction together with the moving unit 70. In other words, the detection unit 80 in the embodiment measures the distance to the holding plate 20, and can thus detect a variation in the distance between the moving unit 70 and the holding plate 20. As a result, the detection unit 80 can detect that the holding plate 20 has moved relative to the moving unit 70 and the first plate 40, when the holding unit 10 moves in the vertical direction together with the moving unit 70. In other word, the detection unit 80 can detect, upon contact of the holding plate 20 with the plate-shaped workpiece and upon restriction of the vertical movement of the holding plate 20, that the holding plate 20 has moved relative to the moving unit 70 and the first plate 40 which move downward.

The control unit 90 controls the respective constituent elements of the conveying apparatus 1, and make the conveying apparatus 1 performs a conveying operation for the plate-shaped workpiece. The control unit 90 controls, for example, the movement of the moving unit 70. The control unit 90 acquires, for example, the detection result from the detection unit 80. The control unit 90 performs control to stop the downward movement of the moving unit 70 when the detection unit 80 detects that the holding unit 10 has made contact with the pate-shaped body. For example, when the detection unit 80 detects that the holding unit 10 has made contact with the plate-shaped workpiece and the moving amount of the holding unit 10 will not be varied any more, the control unit 90 performs control to stop the moving unit 70 moving downward.

The control unit 90 is, for example, a computer including an arithmetic processing unit as arithmetic means, a storage unit as storage means, and an input-output interface unit as communication means. The arithmetic processing unit includes, for example, a microprocessor such as a central processing unit (CPU). The storage unit includes a memory such as a hard disk drive (HDD), a read only memory (ROM), or a random access memory (RAM). The arithmetic processing unit performs various arithmetic operations on the basis of predetermined programs stored in the storage unit. The arithmetic processing unit outputs various control signals to the respective constituent elements through the input-output interface unit according to the detection results, thereby controlling the conveying apparatus 1. The control unit 90 may be the same as or a part of a control unit of the peeling apparatus 100 which will be described later.

The peeling apparatus 100 of the embodiment depicted in FIGS. 3 and 4 is an apparatus for peeling off the wafer 210 to be produced from the ingot 200 formed with a peeling layer 211. The ingot 200 is formed, for example, of silicon carbide (SiC), and is formed to be cylindrical in overall shape. The ingot 200 is, for example, a hexagonal single crystal SiC ingot. The ingot 200 has a c-axis inclined by an off-angle relative to a perpendicular to an end face of the ingot 200, and a c-plane orthogonal to the c-axis. The wafer 210 to be produced is peeled off from the ingot 200, with peeling layer 211 formed inside the ingot 200 as an interface.

The peeling layer 211 is formed by applying a laser beam to the ingot 200 while relatively moving the focal point of the laser beam and the ingot 200 in a horizontal direction, with the focal point positioned at a depth corresponding to the thickness of the wafer 210 to be produced from the end face of the ingot 200. In this instance, the laser beam is a laser beam of such a wavelength as to be transmitted through the ingot 200.

In the formation of the peeling layer 211 inside the SiC ingot, a pulsed laser beam is applied toward the ingot 200, whereby SiC is separated into silicon (Si) and carbon (C). Then, the pulsed laser beam applied next is absorbed in C formed formerly, a modified section in which SiC is separated into Si and C in a chain reaction manner is formed inside the ingot 200 along a processing feeding direction, and cracks extending from the modified section along the c-plane are formed. In this way, the peeling layer 211 including the modified section and the cracks extending along the c-plane from the modified section is formed.

The peeling apparatus 100 includes a holding table 110 and the abovementioned conveying apparatus 1. The holding table 110 holds the ingot 200 on a holding surface 111 thereof. The holding surface 111 has a disk shape and is formed of a porous ceramic or the like. In the embodiment, the holding surface 111 is a plane parallel to a horizontal direction. The holding surface 111 is, for example, connected to a vacuum suction source through a vacuum suction passage. The holding table 110 holds under suction the lower surface side of the ingot 200 placed on the holding surface 111.

In the peeling apparatus 100, the conveying apparatus 1 is disposed to face the holding table 110. The conveying apparatus 1 causes the holding unit 10 to hold under suction the ingot 200 held by the holding table 110. More specifically, the holding unit 10 holds, on the lower surface 21 of the holding plate 20, the upper surface side of the ingot 200 under suction.

Next, in the peeling apparatus 100, an operation performed by the conveying apparatus 1 to peel off the wafer 210 to be produced from the ingot 200 will be described referring to FIGS. 3 and 4. FIG. 3 depicts the manner in which the conveying apparatus 1 approaches the ingot 200 held by the holding table 110, from the upper side toward the lower side, and FIG. 4 depicts the state in which the holding unit 10 has made contact with the ingot 200.

As depicted in FIG. 3, in a state in which the holding unit 10 is not in contact with the ingot 200, the second plate 50 is supported on the upper surface 42 of the first plate 40 due to its own weight. In addition, the holding plate 20 is supported by the second plate 50 through the elastic members 60 and the pin members 30, and its upper surface 22 is spaced from the lower surface 41 of the first plate 40. In this instance, a distance 81 from the detection unit 80 to the upper surface 22 of the holding plate 20 is maximum in the holding unit 10 in the embodiment. The detection unit 80 measures the distance 81 to the upper surface 22 of the holding plate 20, and outputs the detection result to the control unit 90. The distance 81 keeps a substantially fixed value until the holding unit 10 comes into contact with the ingot 200. Note that the substantially fixed value includes errors due to the movement of the moving unit 70 and minute vibrations of the drive source, the elastic members 60, and the like.

As depicted in FIG. 4, when the lower surface 21 of the holding plate 20 of the holding unit 10 makes contact with the upper surface of the ingot 200, the downward movement of the holding plate 20 is restricted by the ingot 200. As a result, the downward movements of the holding plate 20 and the pin members 30 are stopped, and the downward movement of the second plate 50 is also stopped while the shock is mitigated by the elastic members 60. On the other hand, the first plate 40, the moving unit 70, and the detection unit 80 continue moving downward. As a result, the holding plate 20 moves relative to the detection unit 80. The detection unit 80 measures a varied distance 82 to the upper surface 22 of the holding plate 20, and outputs the detection result to the control unit 90.

In the embodiment, when the distance 81 to the upper surface 22 of the holding plate 20 is varied by a predetermined amount to reach the distance 82, the detection unit 80 detects that the holding unit 10 has made contact with the ingot 200 and its moving amount will not be varied any more. On the basis of the detection result of the detection unit 80, the control unit 90 performs control to stop the downward movement of the moving unit 70. As a result, the moving amount when the moving unit 70 and the holding unit 10 move downward can be detected in relation to the thickness of the ingot 200, without preliminarily measuring the thickness of the ingot 200 held by the holding table 110.

Here, in the embodiment, in the state in which the holding unit 10 is not in contact with the ingot 200 as depicted in FIG. 3, the upper surface 22 of the holding plate 20 and the lower surface 41 of the first plate 40 are spaced from each other. Therefore, until the detection unit 80 detects the contact between the holding plate 20 and the ingot 200 and the control unit 90 performs control to stop the moving unit 70 after the holding plate 20 has made contact with the ingot 200, the first plate 40 moving downward together with the moving unit 70 can be restrained from making contact with the holding plate 20 and pressing the holding plate 20 downward.

Further, with the elastic members 60 provided between the pin members 30 and the second plate 50, the shock when the holding plate 20 makes contact with the ingot 200 can be mitigated, so that damage to the peeling layer 211 can be reduced and cracking of the wafer 210 can be restrained.

Figure 5:
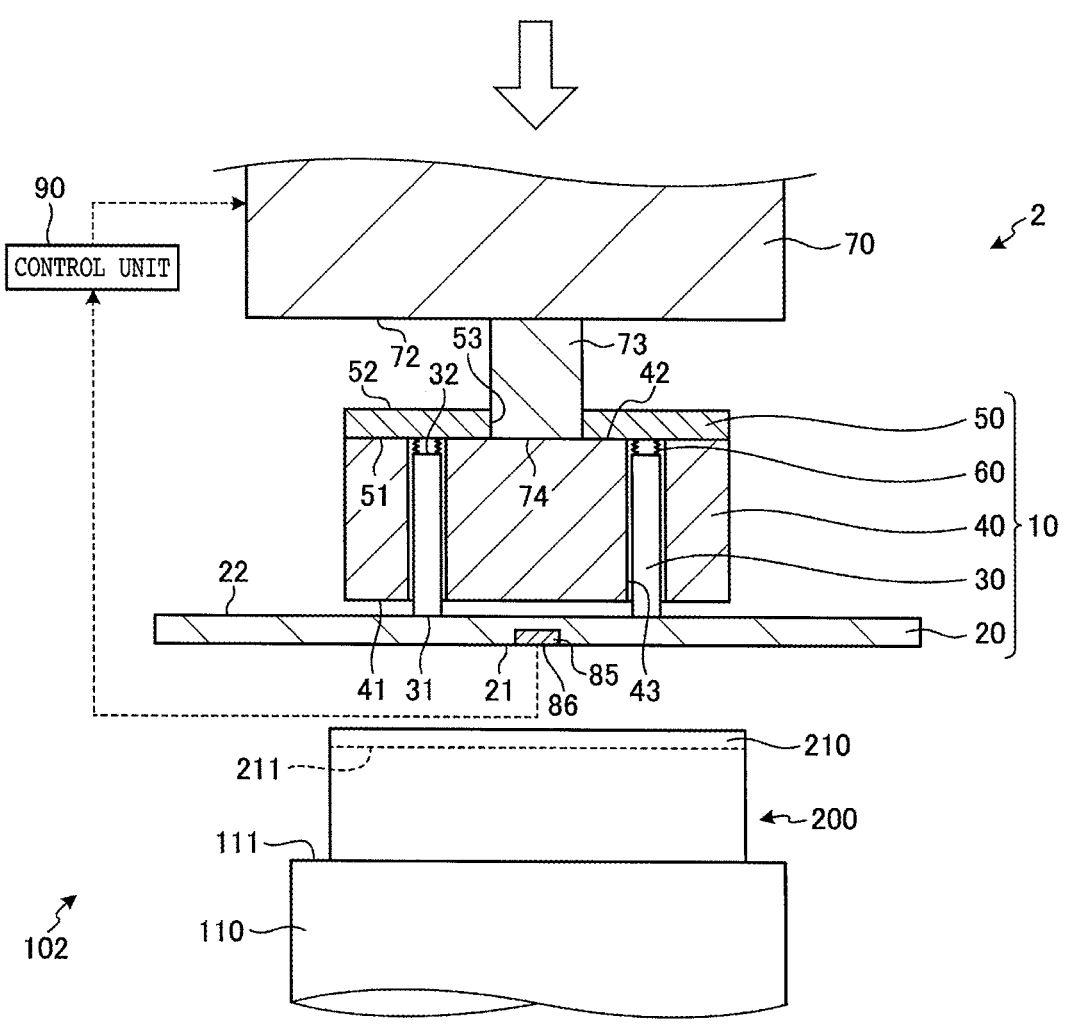
FIG. 5 is a side view depicting, partly in section, a peeling apparatus including a conveying apparatus according to a modification.

Next, the configurations of a conveying apparatus 2 and a peeling apparatus 102 according to a modification of the present invention will be described. FIG. 5 is a side view depicting, partly in section, the peeling apparatus 102 including the conveying apparatus 2 according to the modification. In the modification depicted in FIG. 5, the configurations similar to those in the embodiment are denoted by the same reference symbols as used above, and descriptions thereof are omitted.

The peeling apparatus 102 of the modification has the same configuration as the peeling apparatus 100 of the embodiment, except that the peeling apparatus 102 includes the conveying apparatus 2 of the modification in place of the conveying apparatus 1 of the embodiment. The conveying apparatus 2 of the modification differs from the conveying apparatus 1 of the embodiment in that the conveying apparatus 2 includes a detection unit 85 in place of the detection unit 80.

The detection unit 85, in the modification, is a contact sensor that detects contact on the basis of a variation in a resistance value, a variation in capacitance, or the like upon contact with the plate-shaped workpiece (wafer 210). The detection unit 85, in the modification, is provided in the lower surface 21 of the holding plate 20. The detection unit 85 is embedded in the holding plate 20 from the lower surface 21 side and disposed such that a detection surface 86 of the detection unit 85 is directed downward and that the detection surface 86 is flush with the lower surface 21. The detection unit 85 outputs the detection result to the control unit 90.

The control unit 90, in the modification, performs control to stop the downward movement of the moving unit 70, for example, when the detection unit 85 detects that the holding unit 10 has moved downward and that the holding unit 10 has made contact with the plate-shaped workpiece, that is, when the detection surface 86 of the detection unit 85 makes contact with the plate-shaped workpiece (wafer 210) and a resistance value or capacitance is changed.

As has been described above, the conveying apparatuses 1 and 2 and the peeling apparatuses 100 and 102 according to the embodiment and the modification have the detection units 80 and 85 for detecting that the holding unit 10 has made contact with the plate-shaped workpiece (the wafer 210 peeled off from the ingot 200), whereby it is made unnecessary for the operator to perform operations for measuring or setting the thickness of the plate-shaped workpiece, which contributes to a reduction in the number of operating steps and can prevent human errors.

Note that the present invention is not to be limited to the abovementioned embodiment. In other words, the present invention can be carried out with various modifications in such ranges as not to depart from the gist of the invention.

Further, as described above, the object of measurement by the detection unit 80 of the embodiment is not limited to the holding plate 20 of the holding unit 10. Preferably, a variation in the distance to the holding plate 20 or the second plate 50 which can be moved relative to the moving unit 70, that is, the relative movement, is detected, and on the basis of the detection of the relative movement, the control unit 90 stops the moving unit 70. As a result, even when the moving unit 70 keeps moving downward during the time lag from the detection to the stoppage, an extra time can be given until the collision of the first plate 40 on the holding plate 20 stopped due to contact with the plate-shaped workpiece.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A conveying apparatus for conveying a plate-shaped workpiece by holding the plate-shaped workpiece by a holding unit, the conveying apparatus comprising:

the holding unit that holds the plate-shaped workpiece under suction, the holding unit including a holding plate that holds the plate-shaped workpiece;

a moving unit that moves in a vertical direction together with the holding unit;

a detection unit that detects that the holding unit has moved downward and made initial contact with the plate-shaped workpiece by detecting a predetermined variation in a distance between the moving unit and the holding plate and that the moving amount will not vary any more and vertical movement of the holding plate relative to the plate-shaped workpiece is restricted, wherein the detection unit moves in the vertical direction together with the moving unit; and a control unit that performs control to stop a downward movement of the moving unit and the detection unit when the detection unit detects that the holding unit has made the initial contact with the plate-shaped workpiece, such that upon the initial contact between the plate-shaped workpiece and the holding plate, the holding plate holds the plate-shaped workpiece under suction.

2. The conveying apparatus according to claim 1, wherein the control unit performs control to stop the downward movement of the moving unit when the detection unit detects that the holding unit has made initial contact with the plate-shaped workpiece.

3. The conveying apparatus according to claim 2, wherein the detection unit is provided above the holding unit.

4. The conveying apparatus according to claim 3, wherein the holding unit includes:

a plurality of pin members formed upright on the holding plate, a first plate that is provided above the holding plate and that is formed with a plurality of through-holes allowing the pin members to pass therethrough, and a second plate that is provided above the first plate and that is connected to the pin members, and the first plate and the moving unit are connected to each other and move together.

5. The conveying apparatus according to claim 4, wherein the pin members and the second plate are connected to each other via elastic members which are provided between upper end portions of the pin members and a lower surface of the second plate.

6. The conveying apparatus according to claim 1, wherein the detection unit includes a non-contact distance sensor for measuring a distance to the holding plate.

7. A peeling apparatus for peeling off a wafer to be manufactured from an ingot having a peeling layer formed therein, the peeling layer being formed by applying a laser beam of such a wavelength as to be transmitted through the ingot to the ingot with a focal point of the laser beam positioned inside the ingot at a depth corresponding to a thickness of the wafer to be manufactured from an end face of the ingot, the peeling apparatus comprising:

a holding table that holds the ingot; and a conveying apparatus disposed to face the holding table, wherein the conveying apparatus includes:

a holding unit that holds the wafer under suction, the holding unit including a holding plate that holds the plate-shaped workpiece, a moving unit that moves in a vertical direction together with the holding unit, a detection unit that detects that the holding unit has moved downward and made initial contact with the wafer by detecting a predetermined variation in a distance between the moving unit and the holding plate and that the moving amount will not vary any more and vertical movement of the holding plate relative to the plate-shaped workpiece is restricted, wherein the detection unit moves in the vertical direction together with the moving unit; and a control unit that performs control to stop a downward movement of the moving unit and the detection unit when the detection unit detects that the holding unit has made the initial contact with the wafer, such that upon the initial contact between the plate-shaped workpiece and the holding plate, the holding plate holds the plate-shaped workpiece under suction.

8. The peeling apparatus according to claim 7, wherein the control unit performs control to stop the downward movement of the moving unit when the detection unit detects that the holding unit has made initial contact with the wafer.

9. The peeling apparatus according to claim 8, wherein the detection unit is provided above the holding unit.

10. The peeling apparatus according to claim 9, wherein the holding unit includes:

a plurality of pin members formed upright on the holding plate, a first plate that is provided above the holding plate and that is formed with a plurality of through-holes allowing the pin members to pass therethrough, and a second plate that is provided above the first plate and that is connected to the pin members, and the first plate and the moving unit are connected to each other and move together.

11. The peeling apparatus according to claim 10, wherein the pin members and the second plate are connected to each other via elastic members which are provided between upper end portions of the pin members and a lower surface of the second plate.

12. The peeling apparatus according to claim 7, wherein the detection unit includes a non-contact distance sensor for measuring a distance to the holding plate.

13. A conveying apparatus for conveying a plate-shaped workpiece by holding the plate-shaped workpiece by a holding unit, the conveying apparatus comprising:

the holding unit that holds the plate-shaped workpiece under suction, wherein the holding unit includes:

a holding plate that holds the plate-shaped workpiece, a plurality of pin members formed upright on the holding plate and having a lower end portion provided fixedly on an upper surface of the holding plate, a first plate that is provided above the holding plate and that is formed with a plurality of through-holes allowing the pin members to pass therethrough, and a second plate that is provided above the first plate and that is connected to the pin members, and a moving unit that moves in a vertical direction together with the holding unit, wherein the first plate and the moving unit are connected to each other and move together;

a detection unit that detects that the holding unit has moved downward and made contact with the plate-shaped workpiece; and a control unit that performs control to stop a downward movement of the moving unit when the detection unit detects that the holding unit has made contact with the plate-shaped workpiece, wherein the pin members and the second plate are connected to each other via elastic members which are provided between upper end portions of the pin members and a lower surface of the second plate.

14. The peeling apparatus according to claim 13, wherein the detection unit detects a variation in a distance between the moving unit and the holding plate or a variation in a distance between the moving unit and the second plate.

15. The conveying apparatus according to claim 13, wherein the detection unit detects a variation in a moving amount of the holding unit in the vertical direction when the holding unit moves downward, and the control unit performs control to stop the downward movement of the moving unit when the detection unit detects that the holding unit has made contact with the plate-shaped workpiece and that the moving amount will not vary any more.

16. The conveying apparatus according to claim 15, wherein the detection unit is provided above the holding unit and moves in the vertical direction together with the moving unit.

17. The conveying apparatus according to claim 13, wherein the detection unit includes a non-contact distance sensor for measuring the distance to the holding plate.

\* \* \* \* \*